United States Patent
Besse et al.

(10) Patent No.: US 10,676,380 B2
(45) Date of Patent: Jun. 9, 2020

(54) COMPOSITION AND METHOD FOR CONTINUOUS OR INTERMITTENT REMOVAL OF SOIL FROM RECIRCULATED WASHING SOLUTION

(71) Applicant: Ecolab USA Inc., St. Paul, MN (US)

(72) Inventors: Michael E. Besse, Golden Valley, MN (US); Brenda L. Tjelta, Bulimba (AU); Daniel M. Osterberg, White Bear Lake, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 16/368,933

(22) Filed: Mar. 29, 2019

(65) Prior Publication Data

US 2019/0292078 A1    Sep. 26, 2019

Related U.S. Application Data

(63) Continuation of application No. 13/422,558, filed on Mar. 16, 2012, now Pat. No. 10,287,192.

(60) Provisional application No. 61/453,582, filed on Mar. 17, 2011.

(51) Int. Cl.
| | |
|---|---|
| *C02F 1/52* | (2006.01) |
| *A47L 15/00* | (2006.01) |
| *A47L 15/42* | (2006.01) |
| *C11D 3/04* | (2006.01) |
| *C11D 3/08* | (2006.01) |
| *C11D 3/10* | (2006.01) |

(Continued)

(52) U.S. Cl.
CPC .......... *C02F 1/52* (2013.01); *A47L 15/0055* (2013.01); *A47L 15/4202* (2013.01); *C11D 3/044* (2013.01); *C11D 3/08* (2013.01); *C11D 3/10* (2013.01); *C11D 3/3769* (2013.01); *C11D 3/3773* (2013.01); *C11D 11/0023* (2013.01); *C11D 11/0064* (2013.01); *C02F 2305/04* (2013.01); *C02F 2307/12* (2013.01)

(58) Field of Classification Search
None
See application file for complete search history.

(56) References Cited

U.S. PATENT DOCUMENTS

| | | |
|---|---|---|
| 3,048,548 A | 8/1962 | Martin et al. |
| 3,334,147 A | 8/1967 | Brunelle et al. |
| 4,280,520 A | 7/1981 | Fraula et al. |

(Continued)

FOREIGN PATENT DOCUMENTS

| | | |
|---|---|---|
| CA | 2161864 | 5/1997 |
| JP | 2002-119794 A | 4/2002 |

(Continued)

OTHER PUBLICATIONS

Material Safety Data Sheet, Hychem Inc., Hyperfloc® AF200/300/400/300H/300HH/300PWG/300G/1100 Series (Aug. 7, 2003).

(Continued)

*Primary Examiner* — Nicole Blan
(74) *Attorney, Agent, or Firm* — Merchant & Gould P.C.

(57) ABSTRACT

A method of removing food soils from a recirculated washing solution includes adding a flocculating agent to the recirculated washing solution and separating the particulates from the recirculated washing solution using a hydrocyclone. The flocculating agent causes a portion of the food soils to combine into particulates having a higher density.

9 Claims, 2 Drawing Sheets

(51) Int. Cl.
*C11D 3/37* (2006.01)
*C11D 11/00* (2006.01)

(56) References Cited

U.S. PATENT DOCUMENTS

| | | | |
|---|---|---|---|
| 4,618,914 A | 10/1986 | Sato et al. | |
| 4,782,901 A | 11/1988 | Phelps et al. | |
| 4,830,773 A | 5/1989 | Olson | |
| 5,770,058 A | 6/1998 | Jozwiak | |
| 5,837,151 A | 11/1998 | Jozwiak | |
| 6,001,190 A | 12/1999 | El-Shoubary et al. | |
| 6,343,611 B1 | 2/2002 | El-Shoubary et al. | |
| 6,372,145 B1 | 4/2002 | Tarbet et al. | |
| 6,548,467 B2 | 4/2003 | Baker et al. | |
| 6,589,932 B1 * | 7/2003 | Ricci | C11D 17/0078 134/25.2 |
| 6,689,739 B1 | 2/2004 | Hall | |
| 7,575,625 B2 | 8/2009 | Seida et al. | |
| 10,287,192 B2 | 5/2019 | Besse et al. | |
| 2002/0031989 A1 | 3/2002 | Rogmark | |
| 2004/0159613 A1 | 8/2004 | Bair et al. | |
| 2005/0020464 A1 | 1/2005 | Smith et al. | |
| 2010/0029537 A1 | 2/2010 | Dihora et al. | |
| 2010/0139705 A1 | 6/2010 | Oberlander | |

FOREIGN PATENT DOCUMENTS

| | | |
|---|---|---|
| JP | 2002-541305 A | 12/2002 |
| SU | 1666057 A1 | 7/1991 |
| WO | 2000/60040 A1 | 10/2000 |
| WO | 2004/085587 A2 | 10/2004 |

OTHER PUBLICATIONS

Material Safety Data Sheet, Hychem, Inc., Hyperfloc® AF200/300/400/300-H/300-HH/300PWG/300G/1100 Series (Aug. 18, 2003).

Material Safety Data Sheet, Hychem, Inc., Hyperfloc® CE803/807/808/809/814/824/834/844/854/864/874/884/803G/809G/824G/834G/844G/854G/864G/84G/884G (Jun. 16, 2003).

Material Safety Data Sheet, Hychem, Inc., Hyperfloc® NF 301 (Jul. 15, 2003).

Product Brochure, Hyperfloc Anionic Dry Flocculant AF 308, Jun. 1998.

Product Brochure, Hyperfloc Anionic Dry Flocculant AF306, Jun. 1998.

Product Brochure, Hyperfloc Cationic Emulsion Flocculant CE844 Mar. 2002.

Product Brochure, Hyperfloc Cationic Emulsion Flocculant CE864, Mar. 2002.

* cited by examiner

COMPOSITION AND METHOD FOR CONTINUOUS OR INTERMITTENT REMOVAL OF SOIL FROM RECIRCULATED WASHING SOLUTION

CROSS-REFERENCE TO RELATED APPLICATION

This application is a continuation of U.S. application Ser. No. 13/422,558, filed Mar. 16, 2012, now U.S. Pat. No. 10,287,192, issued May 14, 2019 which claims the benefit of Provisional Application No. 61/453,582, filed Mar. 17, 2011, which is herein incorporated by reference in its entirety.

TECHNICAL FIELD

The present invention relates generally to the field of removing soils from recirculated water in dishmachines. In particular, the present invention relates to removing soils from recirculated water using flocculants in combination with a hydrocyclone.

BACKGROUND

In response to the increasing demand to lower the level of water consumption, various low water dishmachines have been developed that are designed to use up to half the amount of water as conventional dishmachines. While the low water dishmachines effectively reduce the amount of water used during dishwashing cycles, the lower sump volumes and final rinse volumes lead to increased soil accumulation in the sump of the new water-saving dishmachines. For example, if the amount of rinse water is cut in half, the amount of soil in the sump doubles in concentration. As the water in the sump is recirculated within the dishmachine, filming on the ware being cleaned in the dishmachine can occur due to the food soil accumulation in the sump.

Hydrocyclones are well known in the waste water industry for separating solids from solution. Because hydrocyclones have no moving parts or filter screens, they require minimal maintenance. In the waste water industry, hydrocyclones are currently used in undercounter dishmachines to remove particles having a density higher than a pre-determined amount. While hydrocyclones are effective at removing gross food soils (i.e., food pieces such as lettuce), they may not be as effective at removing smaller suspended food particles (i.e., particles less than 2 millimeters (mm) and more particularly less than 1 mm in size).

There is therefore a need for a method for reducing the amount of food soil and more particularly, food soil particles, in recirculated wash solutions.

SUMMARY

The present invention relates to a method of reducing or eliminating food soils from a recirculated aqueous solution of a dishmachine using a chemical treatment in combination with a physical or mechanical means. After a flocculating agent is added to the recirculated aqueous solution of the dishmachine, a hydrocyclone removes the agglomerated food soil particles from the recirculated solution of the dishmachine.

In an embodiment, the present invention relates to a method of removing food soil particles from a recirculated wash solution. The method includes adding a flocculating agent to the recirculated wash solution and separating the agglomerated food soil particles from the recirculated washing solution using a hydrocyclone. The flocculating agent causes the food soil particles to agglomerate into particles having a density greater than at least some of the food soil particles.

In another embodiment, the present invention relates to a method of removing particles from a solution. The method includes forming agglomerated particles having a density greater than water and separating the agglomerated particles from the solution using a mechanical separation device.

In yet another embodiment, the present invention relates to a method of removing food soil particles from a dishwash solution. The method includes forming agglomerated food soil particles, separating the agglomerated food soil particles from the dishwash solution into a concentrate stream and a permeate stream using a hydrocyclone and combining the permeate stream with the dishwash solution. The particles are separated based on a density of the agglomerated food soil particles.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

The method of the present invention reduces and/or eliminates food soils, and more particularly food soil particles, from a sump or recirculated water stream of a dishmachine by using a flocculating agent in combination with a hydrocyclone. The flocculating agent is added to the water in the dishmachine to cause the particles of food soil to agglomerate. The hydrocyclone then separates the agglomerated food soil particles from the water or from the recirculated water solution. The method improves the performance of low water recirculating dishmachines by reducing the filming on ware caused by food soil accumulation in a sump of the dishmachine. An overall reduction of food soil will in turn reduce product consumption. Although the method is described as being used in dishmachines, the method may be used in any application where there is a recirculating wash solution or a reuse condition. For example, the method may be used in the following industries: laundering, food and beverage, and vehicle care.

In a first step of the method of the present invention, a flocculating agent is added to the recirculating water or solution. The flocculating agent functions to agglomerate the food soil particles into flocs or clusters of food soil particles having increased density and particle size compared to at least a portion of the individual food soil particles. Flocculating agents are polymers and agglomeration occurs when segments of the polymer chain adsorb on different particles. Examples of suitable flocculating agents include, for example, cationic, anionic, and nonionic flocculating agents. Examples of suitable cationic flocculating agents include, for example, cationic acrylamide copolymer emulsions.

Examples of suitable commercially available cationic acrylamide copolymer emulsions include, for example, CE 884, CE 844, CE 854 and CE 864, available from Hychem, Inc., Tampa, Fla. Examples of suitable commercially available anionic flocculating agents include, for example, anionic acrylamide copolymer emulsions. Examples of suitable commercially available anionic copolymer emulsions include AF 308, available from Hychem, Inc. Tampa, Fla.

An effective amount of the flocculating agent is added to the recirculated water to cause the food soil particles to agglomerate. As used herein, "food soil particles" refers to particle sized portions of food, such as food less than 2 mm and more particularly less than 1 mm, in size and "gross food soil" refers to food greater than particle size, such as a piece of lettuce or spinach. In one embodiment, an effective amount of flocculating agent is between about 0.1 parts per million (ppm) to about 100 ppm, particularly between about 0.5 ppm and about 50 ppm, and more particularly between about 1 ppm and about 25 ppm. The recirculated water can be treated with the flocculating agent either continuously or intermittently depending on variables such as how frequently the dishmachine is used.

The flocculating agent can be added directly into the recirculated water or may be included as a component of a detergent composition that is used to clean dishware. When the flocculating agent is added directly to the recirculated water, the flocculating agent may be added, for example, in the sump of the dishmachine. If the flocculating agent is added as part of a detergent composition, the formulation strategy of the detergent may be altered to provide room for the flocculating agent. Additionally, the detergent formulation strategy may be altered to prevent altering the charge of the flocculating agent.

After the food soil particles have clumped or agglomerated together, the second step of the method includes using a hydrocyclone to separate the agglomerated food soil particles from the recirculated water. Suitable hydrocyclones include a two-inch polyurethane hydrocyclone available from Flo Trends Systems, Inc., Houston, Tex. The hydrocyclone functions to separate the agglomerated particles from the recirculated water based on a density profile into a concentrate stream and a permeate stream. By flocculating or agglomerating the smaller food soil particles to form larger agglomerated particles having densities greater than that of at least some of the food soil particles, the cyclonic separation can be maximized, resulting in a cleaner permeate stream. In one example, the agglomerated particles have densities greater than a majority of the food soil particles. For example, the agglomerated particles have densities greater than at least 50%, 60%, 70%, 80% or 90% of food soil particles. The flocculating agent enhances the cyclonic separation of the hydrocyclone by forming denser agglomerated food soil particles that settle to the bottom of the hydrocyclone and are forced through the bottom of the hydrocyclone to the concentrate stream. The hydrocyclone separates agglomerated food soil particles having at least a minimum size or density from the recirculated water. The hydrocyclone separates agglomerated food soil particles that are not completely solubilized.

In some embodiments, the hydrocyclone can separate particles that have a density that is different from water. In some instances, the hydrocyclone may be configured to separate out particles that are denser than water. It will be appreciated that, the greater the difference in density between the filtrate and the water, the more effective the cyclonic separation. The size or density at which the agglomerated food soil particulates separate from the recirculated water is a function of, for example: cyclone diameter, exit dimensions, feed pressure and the relative characteristics of the agglomerated food soil particulates and the recirculated water. It will also be appreciated that density is dependent on several variables including temperature, and all discussion herein refers to water at the same conditions as the recirculated water, i.e., at the same temperature.

In some embodiments, the hydrocyclone runs continuously with the dishmachine recirculation pump. Depending on the efficiency of the hydrocyclone, in an alternative embodiment the hydrocyclone may not need to be run continuously with the recirculation pump. At very high efficiencies, such as with the addition of a flocculating agent, the hydrocyclone is capable of keeping the level of food soil particles in the dishmachine sump at minimal desired levels while running intermittently. In one example, the hydrocyclone is run at the same time as the water is recirculated within the dishmachine. In another example, the hydrocyclone is not operated when the water is recirculated within the dishmachine. In one embodiment, the efficiency of the hydrocyclone is increased by about 90% when a flocculating agent is added to the recirculated water to agglomerate and for agglomerated particles have a density greater than water. The combination of the flocculating agent and the hydrocyclone can effectively remove food soils from recirculated water having a food soil level of about 2,000 ppm, about 3,000 ppm, about 4,000 ppm, about 5,000 ppm, about 6,000 ppm, about 7,000 ppm, about 8,000 ppm, about 9,000 ppm, or about 10,000 ppm or higher. As long as the flocculating agent is capable of flocculating the food soil particles into agglomerated particles have a density greater than water, the hydrocyclone is capable of separating the food soils from the water. Although the method is discussed as using a hydrocyclone to separate the food soils from the recirculated water, any mechanical or physical separation device can be used without departing from the intended scope of the present invention.

After the recirculated water passes through the hydrocyclone, the permeate stream is circulated back into the recirculated water to be used while the concentrate stream is disposed of. The permeate stream is thus recycled back into the dishmachine, reducing the amount of water that is consumed and wasted during each run.

Figure 1:
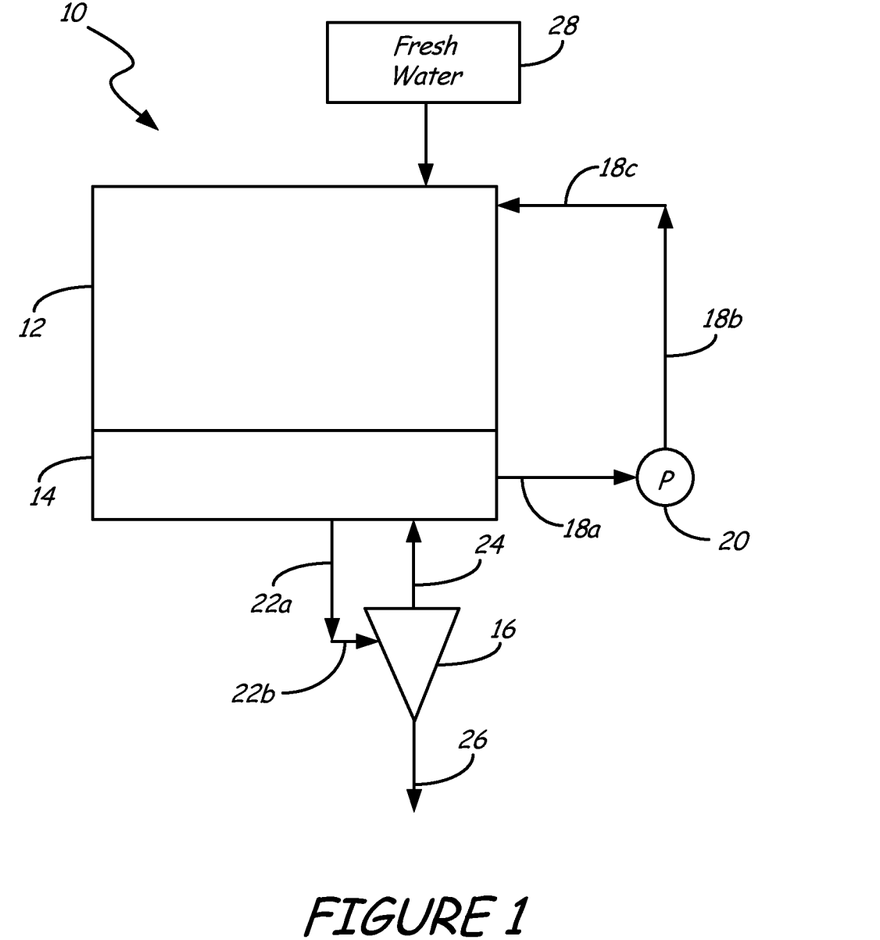
FIG. 1 is a block diagram of an exemplary dishmachine with a hydrocyclone.

The method of the current application is more particularly described with respect to the FIG. 1, which is a block diagram of exemplary system 10 including dishmachine 12 having sump 14 and hydrocyclone 16. In use, water contacts wares in dishmachine 12 and is collected in sump 14. The water in sump 14 is referred to as recirculating water or recirculating solution because water from sump 14 can be recirculated over wares in dishmachine 12 by flowing through lines 18a, 18b, 18c and pump 20.

System 10 also includes hydrocyclone 16 which removes agglomerated food soil particles from the recirculating water of sump 14. As described above, food soil particles are agglomerated by use of an effective amount of a flocculating agent. The recirculating water of sump 14 can flow through lines 22a, 22b to hydrocyclone 16, which separates the water into permeate 24 and concentrate 26. Permeate 24 is returned to sump 14 and combined with the recirculating solution, while concentrate 26, which has an increased concentration of agglomerated food soil particles can be discarded. One skilled in the art will recognize that system 10 is one possible arrangement for hydrocyclone 16. Alternatively, hydrocyclone 16 can receive recirculation water from lines 18a, 18b and/or 118c and be arranged in parallel or in series with pump 20.

A complete wash cycle includes at least one wash step and at least one rinse step. The number and duration of each step of the wash cycle vary by dishmachine. Suitable dishmachines include a door-type or a conveyor-type dishmachine and it is recognized that the location of each wash and rinse step can vary by dishmachine type.

The water of sump 14 can be recirculated over wares in dishmachine 12 during a wash step and/or a rinse step. In a preferred system, water from sump 14 is recirculated during a wash step and fresh water from fresh water source 28 rinses the wares during a rinse step.

Hydrocyclone 16 can be operated or used continuously during the wash cycle. Alternatively, hydrocyclone 16 can be operated or used during a portion of the wash cycle. When hydrocyclone 16 is operated during a portion of the wash cycle, hydrocyclone 16 and pump 26 may be operated at the same time or at different times.

Recirculating water in sump 14 can be used in multiple wash cycles. The flocculating agent can be added at the beginning of each wash cycle or can be as needed. For example, the flocculating agent can be added every several wash cycles.

Detergent Composition

As described above, the flocculating agent may be included in a detergent composition. For example, a suitable detergent composition may include at least one surfactant, at least one alkalinity source, at least one flocculating agent, and optionally at least one functional component.

Suitable alkalinity sources include but are not limited to alkali metal hydroxides, alkali metal carbonates, alkali metal metasilicates, and alkali metal silicates. Specific examples include sodium hydroxide, potassium hydroxide, sodium carbonate, potassium carbonate, a mixture of alkali metal hydroxides, a mixture of alkali metal carbonates, and a mixture of alkali metal hydroxide and alkali metal carbonate. The alkali metal hydroxide, alkali metal silicate, alkali metal metasilicate and/or alkali metal carbonate may be added to the detergent in any form known in the art, including as solid beads, flakes, powder, dissolved in an aqueous solution, or a combination thereof.

The alkalinity source controls the pH of the resulting use solution when water is added to the detergent. The pH of the use solution must be maintained in the alkaline range in order to provide sufficient detergency properties. In one example, the pH of the use solution is between about 7 and about 13. Particularly, the pH of the use solution is between about 9 and about 12. If the pH of the use solution is too high, for example, above 13, the use solution may be too alkaline and attack or damage the surface to be cleaned.

The alkali source of the detergent and the pH of the resulting use solution may differ depending on whether the detergent is for institutional or consumer applications. In one suitable consumer detergent, the alkalinity source consists of at least one alkali metal carbonate, alkali metal metasilicate, alkali metal silicate or combinations thereof, and the resulting use solution has a pH between about 7 and 11. Institutional detergents may have a higher pH than consumer detergents. In one suitable institutional detergent, the alkalinity source consists of at least one alkali metal hydroxide, alkali metal carbonate, alkali metal metasilicate, alkali metal silicate or combinations thereof, and the resulting use solution has a pH between about 9.5 and 13.

When the detergent is provided as a solid, the alkalinity source may also function as a hydratable salt. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. There is no requirement that the hydratable salt be completely anhydrous.

A variety of surfactants can be used in the detergent composition, including, but not limited to: anionic, nonionic, cationic, and zwitterionic surfactants. Surfactants are an optional component of the detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912. When the detergent composition includes a surfactant as a cleaning agent, the cleaning agent is provided in an amount effective to provide a desired level of cleaning. The detergent composition, when provided as a concentrate, can include the surfactant cleaning agent in a range of about 0.05% to about 20% by weight, about 0.5% to about 15% by weight, about 1% to about 15% by weight, about 1.5% to about 10% by weight, and about 2% to about 8% by weight. Additional exemplary ranges of surfactant in a concentrate include about 0.5% to about 8% by weight, and about 1% to about 5% by weight.

Examples of anionic surfactants useful in the detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in the detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. When a nonionic surfactant is present in the detergent composition or controlled release solid, a hydrotrope may also be present. Suitable hydrotropes include, but are not limited to sodium xylene sulfonate, sodium cumene sulfonate, alkyldiphenyloxide disulfonates, ethoxylated phenol, ethoxylated benzyl alcohol and the like. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va. A particularly suitable surfactant is D500, an ethylene oxide/propylene oxide copolymer available from BASF Corporation, Florham Park, N.J.

Examples of cationic surfactants that can be used in the detergent composition include, but are not limited to: amines such as primary, secondary and tertiary monoamines with Cis alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in the detergent composition include, but are not limited to: betaines, imidazolines, and propionates.

When the detergent composition is intended to be used in an automatic dishwashing or warewashing machine, the surfactant(s) selected can be those that provide an acceptable level of foaming when used inside a dishwashing or warewashing machine. Detergent compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

The flocculating agent is present in an amount effective to agglomerate food soil particles. Suitable flocculating agents have been described above. For example, the flocculating agent comprises a cationic flocculating agent, a cationic acrylamide copolymer emulsion, or an anionic flocculating agent. The flocculating agent can also include a combination of flocculating agents.

The detergent composition may be provided in any form, including as a solid detergent composition or as a liquid detergent composition. Example solid and liquid detergent compositions are presented in Tables A and B below.

TABLE A

| Example solid detergent compositions | | | |
|---|---|---|---|
| | Example Range 1 | Example Range 2 | Example Range 3 |
| Alkalinity source | 0.1-90 wt % | 1-75 wt % | 5-60 wt % |
| Water | 0-50 wt % | 0-35 wt % | 0-25 wt % |
| Surfactant | 0.1-15 wt % | 1-10 wt % | 1-5 wt % |
| Flocculating agent | 0.01-15 wt % | 0.01-10 wt % | 0.01-5 wt % |

TABLE B

| Example liquid detergent compositions | | | |
|---|---|---|---|
| | Example Range 1 | Example Range 2 | Example Range 3 |
| Alkalinity source | 0.1-60 wt % | 1-45 wt % | 1-30 wt % |
| Water | 0.1-70 wt % | 1-45 wt % | 1-30 wt % |
| Surfactant | 0.1-15 wt % | 1-10 wt % | 1-5 wt % |
| Flocculating agent | 0.01-15 wt % | 0.01-10 wt % | 0.01-5 wt % |

The detergent compositions can be provided in any of a variety of embodiments of detergent compositions. In one embodiment, the detergent composition may be substantially free of phosphorous, nitrilotriacetic acid (NTA) and ethylenediaminetetraacetic acid (EDTA). Phosphorus-free means a composition having less than approximately 0.5 wt %, more particularly, less than approximately 0.1 wt %, and even more particularly less than approximately 0.01 wt % phosphorous based on the total weight of the composition. NTA-free means a composition having less than approximately 0.5 wt %, less than approximately 0.1 wt %, and particularly less than approximately 0.01 wt % NTA based on the total weight of the composition. When the composition is NTA-free, it is also compatible with chlorine, which functions as an anti-redeposition and stain-removal agent. When diluted to a use solution, the detergent composition includes phosphorous, NTA and EDTA concentrations of less than approximately 100 ppm, particularly less than approximately 10 ppm, and more particularly less than approximately 1 ppm.

The detergent composition can be diluted with water, known as dilution water, to form a concentrate solution or a use solution. In general, a concentrate refers to a composition that is intended to be diluted with water to provide a use solution; a use solution is dispersed or used without further dilution. The use solution can be used to clean substrates such as during warewashing.

In one example, the detergent composition is diluted such that the use solution has sufficient detersivity. The typical dilution factor is between approximately 1 and approximately 10,000 but will depend on factors including water hardness, the amount of soil to be removed and the like. In one embodiment, the solid detergent composition is diluted at a ratio of between about 1:10 and about 1:1000 concentrate to water. Particularly, the solid detergent composition is diluted at a ratio of between about 1:100 and about 1:5000 concentrate to water. More particularly, the solid detergent composition is diluted at a ratio of between about 1:250 and 1:2000 concentrate to water.

Suitable concentration ranges for the use solution are presented in Table C.

TABLE C

| Example concentrations in a use solution | | | | | |
|---|---|---|---|---|---|
| | Example Range 1 | Example Range 2 | Example Range 3 | Example Range 4 | Example Range 5 |
| Alkalinity source | 1-1800 ppm | 1-900 ppm | 10-750 ppm | 50-600 ppm | 50-1200 ppm |
| Surfactant | 1-300 ppm | 1-150 ppm | 10-100 ppm | 10-50 ppm | 10-100 ppm |
| Flocculating agent | 0.1-300 ppm | 0.1-150 ppm | 0.1-100 ppm | 0.1-50 ppm | 0.1-100 ppm |

Additional Functional Materials

The detergent compositions can also include various additional functional components. In some embodiments, the alkalinity source, surfactant or surfactant system, flocculating agent, an optionally water may make up a large amount, or even substantially all of the total weight of the detergent composition, for example, in embodiments having few or no additional functional materials disposed therein.

In alternative embodiments, functional materials are added to provide desired properties and functionalities to the detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional materials may be used. Moreover, the components discussed above may be multi-functional and may also provide several of the functional benefits discussed below.

Secondary Alkali Source

The detergent composition can include one or more secondary alkali sources. Examples of suitable secondary alkali sources of the detergent composition include, but are not limited to alkali metal carbonates, alkali metal hydroxides and alkali metal silicates. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to: sodium or potassium hydroxide. The alkali metal hydroxide may be added to the detergent composition in any form known in the art, including as solid beads, dissolved in an aqueous solution, or a combination thereof. Examples of alkali metal silicates include, but are not limited to sodium or potassium silicate or polysilicate, sodium or potassium metasilicate and hydrated sodium or potassium metasilicate or a combination thereof.

Builders or Water Conditioners

The detergent composition can include one or more building agents, also called chelating or sequestering agents (e.g., builders), including, but not limited to: condensed phosphates, alkali metal carbonates, phosphonates, aminocarboxylic acids, and/or polycarboxylic acids. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the solid detergent composition is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the detergent composition by fixing the free water present in the detergent composition as water of hydration.

Examples of phosphonates include, but are not limited to: 2-phosphonobutane-1,2,4-tricarboxylic acid (PBTC), 1-hydroxyethane-1, 1-diphosphonic acid, $CH_2C(OH)[PO(OH)_2]_2$; aminotri(methylenephosphonic acid), $N[CH_2 PO(OH)_2]_3$; aminotri(methylenephosphonate), sodium salt (ATMP), $N[CH_2 PO(ONa)_2]_3$; 2-hydroxyethyliminobis (methylenephosphonic acid), $HOCH_2CH_2 N[CH_2PO(OH)_2]_2$; diethylenetriaminepenta(methylenephosphonic acid), $(HO)_2POCH_2 N[CH_2 CH_2 N[CH_2 PO(OH)_2]_2]_2$; diethylenetriaminepenta(methylenephosphonate), sodium salt (DTPMP), $C_9 H_{(28-x)} N_3 Na_x O_{15} P_5$ (x=7); hexamethylenediamine(tetramethylenephosphonate), potassium salt, $C_{10}H_{(28-x)}N_2K_x O_{12} P_4$ (x=6); bis(hexamethylene)triamine (pentamethylenephosphonic acid), $(HO_2)POCH_2 N[(CH_2)_2 N[CH_2 PO(OH)_2]_2]_2$; and phosphorus acid, $H_3PO_3$. Preferred phosphonates include HEDP, PBTC, ATMP and combinations thereof. A preferred phosphonate combination is ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the detergent composition is phosphorous-free.

Useful aminocarboxylic acid materials containing little or no NTA include, but are not limited to: N-hydroxyethylamindiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the detergent composition is free of aminocarboxylates.

Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2^-$) groups such as polyacrylic acid, maleic acid, tartaric acid, gluconic acid, acetic acid, benzoic acid, citric acid, fomic acid, lactic acid, malic acid, glutamic acid, adipic acid, oxalic acid, maleic/olefin polymer, sulfonated polymer or terpolymer, acrylic/maleic polymer, polymethacrylic acid, acrylic acid-methacrylic acid polymers, hydrolyzed polyacrylamide, hydrolyzed polymethacrylamide, hydrolyzed polyamide-methacrylamide polymers, hydrolyzed polyacrylonitrile, hydrolyzed polymethacrylonitrile, and hydrolyzed acrylonitrile-methacrylonitrile polymers. Other suitable water conditioning polymers include starch, sugar or polyols comprising carboxylic acid or ester functional groups. Exemplary carboxylic acids include but are not limited to maleic acid, acrylic, methacrylic and itaconic acid or salts thereof. Exemplary ester functional groups include aryl, cyclic, aromatic and $C_1$-$C_{10}$ linear, branched or substituted esters. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers Hardening Agents The detergent compositions can also include a hardening agent in addition to, or in the form of, the builder. A hardening agent is a compound or system of compounds, organic or inorganic, which significantly contributes to the uniform solidification of the detergent composition. Preferably, the hardening agents are compatible with the cleaning agent and other active ingredients of the detergent composition and are capable of providing an effective amount of hardness and/or aqueous solubility to the processed detergent composition. The hardening agents should also be capable of forming a homogeneous matrix with the cleaning agent and other ingredients when mixed and solidified to provide a uniform dissolution of the cleaning agent from the detergent composition during use.

The amount of hardening agent included in the detergent composition will vary according to factors including, but not limited to: the type of detergent composition being prepared, the ingredients of the detergent composition, the intended use of the detergent composition, the quantity of dispensing solution applied to the solid detergent composition over time during use, the temperature of the dispensing solution, the hardness of the dispensing solution, the physical size of the detergent composition, the concentration of the other ingredients, and the concentration of the cleaning agent in the detergent composition. It is preferred that the amount of the hardening agent included in the detergent composition is effective to combine with the cleaning agent and other ingredients of the detergent composition to form a homogeneous mixture under continuous mixing conditions and a temperature at or below the melting temperature of the hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately 1 minute to approximately 3 hours, particularly approximately 2 minutes to approximately 2 hours, and particularly approximately 5 minutes to approximately 1 hour. A minimal amount of heat from an external source may be applied to the mixture to facilitate processing of the mixture. It is preferred that the amount of the hardening agent included in the detergent composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. A preferred organic hardening agent is a polyethylene glycol (PEG) compound. The solidification rate of compositions comprising a polyethylene glycol hardening agent will vary, at least in part, according to the amount and the molecular weight of the polyethylene glycol added to the detergent composition. Examples of suitable polyethylene glycols include, but are not limited to: solid polyethylene glycols of the general formula $H(OCH_2CH_2)_nOH$, where n is greater than 15, particularly approximately 30 to approximately 1700. Typically, the polyethylene glycol is a solid in the form of a free-flowing powder or flakes, having a molecular weight of approximately 1,000 to approximately 100,000, particularly having a molecular weight of at least approximately 1,450 to approximately 20,000, more particularly between approximately 1,450 to approximately 8,000. The polyethylene glycol is present at a concentration of from approximately 1% to 75% by weight and particularly approximately 3% to approximately 15% by weight. Suitable polyethylene glycol compounds include, but are not limited to: PEG 4000, PEG 1450, and PEG 8000 among others, with PEG 4000 and PEG 8000 being most preferred. An example of a commercially available solid polyethylene glycol includes, but is not limited to: CARBOWAX, available from Union Carbide Corporation, Houston, Tex.

Preferred inorganic hardening agents are hydratable inorganic salts, including, but not limited to: sulfates and bicarbonates. The inorganic hardening agents are present at concentrations of up to approximately 50% by weight, particularly approximately 5% to approximately 25% by weight, and more particularly approximately 5% to approximately 15% by weight. In one embodiment, however, the solid controlled release composition if free of sulfates and carbonates including soda ash.

Urea particles can also be employed as hardeners in the detergent compositions. The solidification rate of the compositions will vary, at least in part, to factors including, but not limited to: the amount, the particle size, and the shape of the urea added to the composition. For example, a particulate form of urea can be combined with a cleaning agent and other ingredients, and preferably a minor but effective amount of water. The amount and particle size of the urea is effective to combine with the cleaning agent and other ingredients to form a homogeneous mixture without the application of heat from an external source to melt the urea and other ingredients to a molten stage. It is preferred that the amount of urea included in the composition is effective to provide a desired hardness and desired rate of solubility of the composition when placed in an aqueous medium to achieve a desired rate of dispensing the cleaning agent from the solidified composition during use. In some embodiments, the composition includes between approximately 5% to approximately 90% by weight urea, particularly between approximately 8% and approximately 40% by weight urea, and more particularly between approximately 10% and approximately 30% by weight urea.

The urea may be in the form of prilled beads or powder. Prilled urea is generally available from commercial sources as a mixture of particle sizes ranging from about 8-15 U.S. mesh, as for example, from Arcadian Sohio Company, Nitrogen Chemicals Division. A prilled form of urea is preferably milled to reduce the particle size to about 50 U.S. mesh to about 125 U.S. mesh, particularly about 75-100 U.S. mesh, preferably using a wet mill such as a single or twin-screw extruder, a Teledyne mixer, a Ross emulsifier, and the like.

Bleaching Agents

Bleaching agents suitable for use in the detergent composition for lightening or whitening a substrate include bleaching compounds capable of liberating an active halogen species, such as $Cl_2$, $Br_2$, $—OCl^-$ and/or $—OBr^-$, under conditions typically encountered during the cleansing process. Suitable bleaching agents for use in the detergent compositions include, but are not limited to: chlorine-containing compounds such as chlorine, hypochlorites, or chloramines. Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the disclosure of which is incorporated by reference herein). A bleaching agent may also be a peroxygen or active oxygen source such as hydrogen peroxide, perborates, sodium carbonate peroxyhydrate, potassium permonosulfate, and sodium perborate mono and tetrahydrate, with and without activators such as tetraacetylethylene diamine. When the concentrate includes a bleaching agent, it can be included in an amount between approximately 0.1% and approximately 60% by weight, between approximately 1% and approximately 20% by weight, between approximately 3% and approximately 8% by weight, and between approximately 3% and approximately 6% by weight.

Fillers

The detergent composition can include an effective amount of detergent fillers which do not perform as a cleaning agent per se, but cooperates with the cleaning agent to enhance the overall cleaning capacity of the detergent composition. Examples of detergent fillers suitable for use in the present detergent compositions include, but are not limited to: sodium sulfate and sodium chloride. When the concentrate includes a detergent filler, it can be included in an amount up to approximately 50% by weight, between approximately 1% and approximately 30% by weight, or between approximately 1.5% and approximately 25% by weight.

Defoaming Agents

A defoaming agent for reducing the stability of foam may also be included in the detergent composition. Examples of defoaming agents include, but are not limited to: ethylene oxide/propylene block polymers such as those available under the name Pluronic® N-3 available from BASF Corporation, Florham Park, N.J.; silicone compounds such as silica dispersed in polydimethylsiloxane, polydimethylsiloxane, and functionalized polydimethylsiloxane such as those available under the name Abil® B9952 available from Goldschmidt Chemical Corporation, Hopewell, Va.; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated herein by reference. When the concentrate includes a defoaming agent, the defoaming agent can be provided in an amount between approximately 0.0001% and approximately 10% by weight, between approximately 0.001% and approximately 5% by weight, or between approximately 0.01% and approximately 1.0% by weight.

Anti-Redeposition Agents

The detergent composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride polymers, cellulosic derivatives such as hydroxyethyl cellulose, hydroxypropyl cellulose and carboxymethyl cellulose. When the concentrate includes an anti-redeposition agent, the anti-redeposition agent can be included in an amount between approximately 0.5% and approximately 10% by weight, and between approximately 1% and approximately 5% by weight.

Stabilizing Agents

The detergent composition may also include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, between approximately 0.5% and approximately 15% by weight, and between approximately 2% and approximately 10% by weight.

Dispersants

The detergent composition may also include dispersants. Examples of suitable dispersants that can be used in the detergent composition include, but are not limited to: maleic acid/olefin polymers, polyacrylic acid, and mixtures thereof. The concentrate need not include a dispersant, but when a dispersant is included it can be included in an amount that provides the desired dispersant properties. Exemplary ranges of the dispersant in the concentrate can be up to approximately 20% by weight, between approximately 0.5% and approximately 15% by weight, and between approximately 2% and approximately 9% by weight.

Enzymes

Enzymes that can be included in the detergent composition include those enzymes that aid in the removal and/or anti-redeposition of starch, protein, fats, oils and combinations thereof. Exemplary types of enzymes include, but are not limited to: proteases, alpha-amylases, lipases and mixtures thereof. Exemplary proteases that can be used include, but are not limited to: those derived from *Bacillus licheniformix, Bacillus lenus, Bacillus alcalophilus*, and *Bacillus amyloliquefacins*. Exemplary alpha-amylases include *Bacillus subtilis, Bacillus amyloliquefaceins* and *Bacillus licheniformis*. The concentrate need not include an enzyme, but when the concentrate includes an enzyme, it can be included in an amount that provides the desired enzymatic activity when the detergent composition is provided as a use composition. Exemplary ranges of the enzyme in the concentrate include up to approximately 15% by weight, between approximately 0.5% to approximately 10% by weight, and between approximately 1% to approximately 5% by weight.

Fragrances and Dyes

Various dyes, odorants including perfumes, and other aesthetic enhancing agents can also be included in the detergent composition. Suitable dyes that may be included to alter the appearance of the detergent composition, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greensboro, N.C.

Fragrances or perfumes that may be included in the detergent compositions include, but are not limited to:

terpenoids such as citronellol, aldehydes such as amyl cinnamaldehyde, a jasmine such as C1S-jasmine or jasmal, and vanillin.

Thickeners

The detergent compositions can include a rheology modifier or a thickener. The rheology modifier may provide the following functions: increasing the viscosity of the detergent compositions; increasing the particle size of liquid use compositions when dispensed through a spray nozzle; providing the use compositions with vertical cling to surfaces; providing particle suspension within the use compositions; or reducing the evaporation rate of the use compositions.

The rheology modifier may provide a use composition that is pseudo plastic, in other words the use composition or material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed through a nozzle, the material undergoes shear as it is drawn up a feed tube into a spray head under the influence of pressure and is sheared by the action of a pump in a pump action sprayer. In either case, the viscosity can drop to a point such that substantial quantities of the material can be applied using the spray devices used to apply the material to a soiled surface. However, once the material comes to rest on a soiled surface, the materials can regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, particularly five minutes or more.

Examples of suitable thickeners or rheology modifiers are polymeric thickeners including, but not limited to: polymers or natural polymers or gums derived from plant or animal sources. Such materials may be polysaccharides such as large polysaccharide molecules having substantial thickening capacity. Thickeners or rheology modifiers also include clays.

A substantially soluble polymeric thickener can be used to provide increased viscosity or increased conductivity to the use compositions. Examples of polymeric thickeners for the aqueous compositions of the invention include, but are not limited to: carboxylated vinyl polymers such as polyacrylic acids and sodium salts thereof, ethoxylated cellulose, polyacrylamide thickeners, cross-linked, xanthan compositions, sodium alginate and algin products, hydroxypropyl cellulose, hydroxyethyl cellulose, and other similar aqueous thickeners that have some substantial proportion of water solubility. Examples of suitable commercially available thickeners include, but are not limited to: Acusol, available from Rohm & Haas Company, Philadelphia, Pa.; and Carbopol, available from B.F. Goodrich, Charlotte, N.C.

Examples of suitable polymeric thickeners include, but not limited to: polysaccharides. An example of a suitable commercially available polysaccharide includes, but is not limited to, Diutan, available from Kelco Division of Merck, San Diego, Calif. Thickeners for use in the compositions further include polyvinyl alcohol thickeners, such as, fully hydrolyzed (greater than 98.5 mol acetate replaced with the —OH function).

An example of a particularly suitable polysaccharide includes, but is not limited to, xanthans. Such xanthan polymers are preferred due to their high water solubility, and great thickening power. Xanthan is an extracellular polysaccharide of xanthomonas campestras. Xanthan may be made by fermentation based on corn sugar or other corn sweetener by-products. Xanthan comprises a poly beta-(1-4)-D-Glucopyranosyl backbone chain, similar to that found in cellulose. Aqueous dispersions of xanthan gum and its derivatives exhibit novel and remarkable rheological properties. Low concentrations of the gum have relatively high viscosities which permit it to be used economically. Xanthan gum solutions exhibit high pseudo plasticity, i.e. over a wide range of concentrations, rapid shear thinning occurs that is generally understood to be instantaneously reversible. Non-sheared materials have viscosities that appear to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is herein incorporated by reference. Suitable crosslinking agents for xanthan materials include, but are not limited to: metal cations such as $Al^{+3}$, $Fe^{+3}$, $Sb^{+3}$, $Zr^{+4}$ and other transition metals. Examples of suitable commercially available xanthans include, but are not limited to: KELTROL®, KELZAN® AR, KELZAN® D35, KELZAN® S, KELZAN® XZ, available from Kelco Division of Merck, San Diego, Calif. Known organic crosslinking agents can also be used. A preferred crosslinked xanthan is KELZAN® AR, which provides a pseudo plastic use composition that can produce large particle size mist or aerosol when sprayed.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Examples 1, 2, 3 and 4

Four 8 ounce jars were used to simulate a sump of a dishmachine. To determine whether a flocculating agent would increase the efficiency of a hydrocyclone, four separate flocculating agents were first tested to see their effects on food soils. About 3,000 ppm of bean soil, prepared from a can of baked beans, and about 10 ppm of a flocculent were added to each jar. In particular, Example 1 used Hyperfloc CR 844, Example 2 used Hyperfloc CR 854, Example 3 used Hyperfloc CR 864 and Example 4 used Hyperfloc CE 884, which are each cationic acrylamide copolymer flocculating agents.

Each of the jars was agitated for about 5 seconds and placed on a stationary platform. The jars were observed immediately after the jars were agitated and about 24 hours after the jars were agitated.

Immediately after agitation, all of the flocculating agents of Examples 1-4 appeared to flocculate about the same amount of food soil particles. All of the flocculated food soil particles collected at the top of the jars on the surface of the water. After about 24 hours, all of the flocculated food soil particles settled to the bottom of the jars, indicating that the density of the flocculated food soils had increased. Thus, the flocculating agents of Examples 1, 2, 3 and 4 were effective at agglomerating the food soil particles into agglomerated particles having a density greater than water.

Examples 5, 6, 7 and 8

Four 8 ounce jars were used to simulate a sump of a dishmachine. To determine whether a flocculating agent used in combination with a detergent would increase the efficiency of a hydrocyclone, four individual flocculating agents were combined with a detergent and tested to see their effects on food soils. About 3,000 ppm of bean soil, 1,000 ppm of Solid Power detergent, available from Ecolab Inc., Saint Paul, Minn., and about 10 ppm of a flocculent were added to each jar. In particular, Example 5 used Hyperfloc CR 844, Example 6 used Hyperfloc CR 854, Example 7 used Hyperfloc CR 864 and Example 8 used Hyperfloc CE 884.

Each of the jars were agitated for about 5 seconds and placed on a stationary platform. Immediately after agitated, all of the flocculating agents of Examples 5, 6, 7 and 8 appeared to flocculate about the same amount of food soil particles. The location of the flocculated food soil particles for each of Examples 5, 6, 7 and 8 is listed below in Table 1.

TABLE 1

| | Location of Soil |
|---|---|
| Example 5 | All of the flocculated food soil particles settled on the bottom of the jar |
| Example 6 | The flocculated food soil particles settled at the bottom of the jar and floated at the top of the jar |
| Example 7 | All of the flocculated food soil particles floated at the top of the jar |
| Example 8 | The flocculated food soil particles settled at the bottom of the jar and floated at the top of the jar |

As can be seen by comparing the results of adding just a flocculating agent (Examples 1-4) to a solution of food soil particles and adding a flocculating agent and detergent (Example 5-8) to a solution of food soil particles, the detergent changed the surface tension of the flocculating agents. The detergent allowed some of the flocculated food soil to settle more quickly than others. Faster settling flocculated food soil is beneficial for separating from water using a hydrocyclone. Thus, because the composition of Example 5 caused the food soil to settle to the bottom of the jar, indicating increased density, the flocculating agent of Example 5 would be the most effective when used with a hydrocyclone, followed by the compositions of Examples 6 and 8. Lastly, while the composition of Example 7 could be used with a hydrocyclone, it may not be as immediately effective as the compositions of Examples 5, 6 and 8 when used with a hydrocyclone.

Because the composition of Example 5 caused the flocculated food soil to settle within the shortest period of time when compared to the compositions of Examples 6-8, the composition of Example 5 was then tested to determine if there was a visual difference in the outlet stream of a hydrocyclone with and without a flocculating agent added to the sump. The tests were run at a sump volume of about 24.5 gallons and a pressure of about 20 pounds per square inch (psi).

The food soils and detergent were added to the sump and the pump was turned on to thoroughly mix the sump. The hydrocyclone was then run for about 30 seconds and samples were collected from the top outlet, the bottom outlet and the sump.

The hydrocyclone was then bypassed while the flocculating agent was added and allowed to mix with the food soils. The hydrocyclone was run for about 30 seconds and the same samples were collected as above.

Upon visual observation, the samples with and without the flocculating agent did not differ substantially in appearance. However, when the samples were disturbed, the flocculated food soil in the samples settled back to the bottom of the sump much more quickly than the food soil in the samples that did not include a flocculating agent.

The composition of Example 5 was then tested to determine whether the efficiency of a hydrocyclone improved when a flocculating agent was added to the sump. Samples were taken once every minute for 10 minutes and then once every two minutes for another 10 minutes. The percent transmittance was measured and recorded at each interval.

As shown in Table 2, while the percent transmittance increased with time, the model was based on decreasing food soil concentration with time, so the data was transformed and 100% transmittance was used. Additionally, because an absolute scale was not developed to relate food soil concentration to percent transmittance, both the data and the theoretical model were normalized to the range 0-1. Table 2 shows the percent transmittance, 100% transmittance, and normalized value at each time interval.

TABLE 2

| Time (min) | % T | 100-% T | Normalized |
|---|---|---|---|
| 0 | 75.8 | 24.2 | 1.000 |
| 1 | 79.0 | 21.0 | 0.868 |
| 2 | 80.6 | 19.4 | 0.802 |
| 3 | 82.6 | 17.4 | 0.719 |
| 4 | 83.4 | 16.6 | 0.686 |
| 5 | 84.0 | 16.0 | 0.661 |
| 6 | 83.2 | 16.8 | 0.694 |
| 7 | 83.2 | 16.8 | 0.694 |
| 8 | 84.4 | 15.6 | 0.645 |
| 9 | 83.6 | 16.4 | 0.678 |
| 10 | 83.8 | 16.2 | .0669 |
| 12 | 84.2 | 15.8 | 0.653 |
| 14 | 85.0 | 15.0 | 0.620 |
| 16 | 84.6 | 15.4 | 0.636 |
| 18 | 84.4 | 15.6 | 0.645 |
| 20 | 84.8 | 15.2 | 0.628 |

Figure 2:
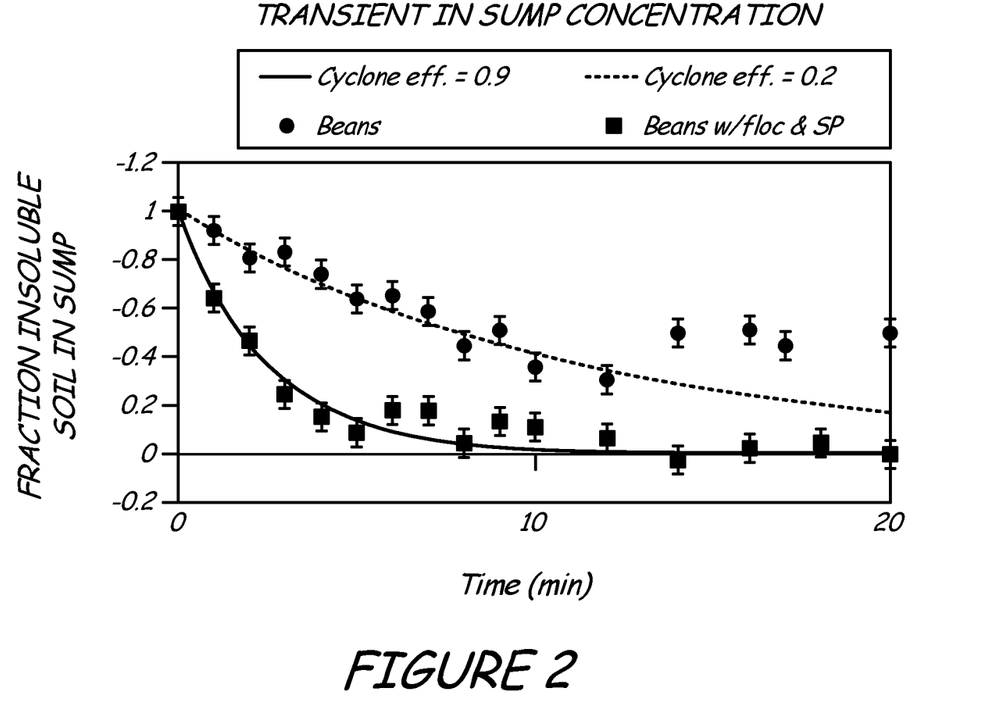
FIG. 2 is a plot illustrating actual and theoretical values for a fraction of insoluble soil in solution over time for solutions with and without a flocculating agent.

In FIG. 2, the fraction of insoluable soil in the sump was plotted against time for a solution without a flocculation agent and a solution with a flocculation agent. FIG. 2 also includes the theoretical separation curve for both solutions (cyclone eff.), which was determined by Equation 1.

$$x = x_0 e^{-\eta\left(\frac{t}{\tau}\right)} \quad (1)$$

Where:
x=concentration of soil in machine sump at time t
$x_0$=initial concentration of soil in machine sump (t=0)
η=efficiency of the separation
t=time
τ=residence time=volume of wash sump/volumetric flow rate of rinse water entering sump The theoretical separation curve was fit to the data by adjusting the efficiency of the separation (η) and such that the asymptote laid at zero. The hydrocyclone was about 20% efficient when no flocculating agent was present. By adding a small amount of flocculating agent to the sump, the efficiency of the hydrocyclone was increased up to about 90%.

Examples 9, 10, 11, 12, 13, 14, and 15

Seven 8 ounce jars were used to simulate a sump of a dishmachine. To determine whether cationic, anionic, and nonionic flocculating agents would perform in a similar manner, five cationic, one anionic and one nonionic flocculants were tested to see their effects on food soils. About 5 ppm of flocculent agent was added to each jar containing a 5% spinach food soil solution. In particular, Examples 9, 10, 11, 12, and 13 used the cationic flocculants CE 884, CE 874, CE 864, CE 854 and CE 844, respectively, Example 14 used the anionic flocculent AF 308, and Example 15 used the nonionic flocculent NF 301.

The test showed that the cationic and anionic flocculants (Examples 9-14) exhibited flocculation of the spinach particles, with the cationic flocculants exhibiting the greatest effect. The nonionic flocculent showed no effect on the spinach soil.

The method of the present invention includes using a flocculating agent in combination with a hydrocyclone to remove food soil, and more particularly, food soil particles, from recirculated water. The flocculating agent causes the food soil particles to agglomerate and form larger, denser flocculated particles. The hydrocyclone then separates the flocculated food soil particles from the recirculated water to create a permeate stream and a concentrate stream. The permeate stream is combined with the recirculated water while the concentrate stream is disposed. The method increases the efficiency of the hydrocyclone and reduces the amount of water used in a dishmachine by increasing the amount of food soil filtered from the recirculated water and recycling the water in the permeate stream.

In some embodiments, one or more flocculating agents may be formulated into a detergent composition. In some embodiments, a detergent composition such as a warewashing detergent composition may include any number of different components. For example, a warewashing detergent composition may include one or more of an alkalinity source, one or more builders and one or more nonionic, anionic, cationic and/or amphoteric surfactants as well as one or more flocculating agents such as the cationic flocculants described herein. In some embodiments, a warewashing detergent may also include one or more of a thickening agent, a rinse aid, a bleaching agent, a sanitizing agent, a defoaming agent, an anti-redeposition agent and a stabilizing agent.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method of removing food soil particles from an aqueous solution in a dishmachine comprising:
    (a) performing a wash cycle with a wash solution comprising a detergent composition;
    (b) forming a used wash solution comprising food soil particles;
    (c) collecting the used wash solution;
    (d) adding a flocculating agent to the used wash solution to agglomerate the food soil particles into agglomerated particles; and
    (e) separating the agglomerated particles from the used wash solution using a hydrocyclone.

2. The method of claim 1, wherein the hydrocyclone is used during at least a portion of the wash cycle.

3. The method of claim 1, wherein the hydrocyclone is used continuously during the wash cycle.

4. The method of claim 1, wherein the flocculating agent comprises a cationic flocculating agent.

5. A method of removing food soils from a solution in a dishwashing machine comprising:
    (a) performing a wash cycle with a wash solution comprising a detergent composition;
    (b) forming a used wash solution comprising food soil particles;
    (c) collecting the used wash solution;
    (d) adding a flocculating agent to the used wash solution to agglomerate the food soil particles into agglomerated food soil particles;
    (e) separating the agglomerated food soil particles from the used wash solution using mechanical separation.

6. The method of claim 5, wherein adding a flocculating agent to the solution occurs intermittently.

7. The method of claim 5, wherein adding a flocculating agent to the solution occurs continuously.

8. The method of claim 5, wherein the flocculating agent comprises a cationic flocculating agent.

9. The method of claim 5, wherein the flocculating agent comprises an anionic flocculating agent.

* * * * *